United States Patent [19]
Okada et al.

[11] Patent Number: 5,636,962
[45] Date of Patent: Jun. 10, 1997

[54] AUTOMATIC TRANSFER APPARATUS

[75] Inventors: Yasuhiro Okada, Nagoya; Takeo Kondo, Toyoake; Katsumi Isogai, Okazaki, all of Japan

[73] Assignees: Toyoda Koki Kabushiki Kaisha, Kariya; Toyota Jidosha Kabushiki Kaisha, Toyota, both of Japan

[21] Appl. No.: 309,898

[22] Filed: Sep. 20, 1994

[30] Foreign Application Priority Data

Sep. 20, 1993 [JP] Japan ................... 5-255260

[51] Int. Cl.⁶ ................................................ B65G 65/02
[52] U.S. Cl. ........................ 414/749; 74/89.12; 414/662
[58] Field of Search ................................. 414/659, 662, 414/280, 749; 198/774.1; 74/89.12, 89.15, 422, 424.8 R

[56] References Cited

U.S. PATENT DOCUMENTS

| | | | |
|---|---|---|---|
| 3,665,771 | 5/1972 | Blatt | 74/89.12 X |
| 4,479,576 | 10/1984 | Di Rosa. | |
| 4,538,950 | 9/1985 | Shiomi et al. | 414/749 X |
| 4,669,607 | 6/1987 | Mason | 198/468.6 X |
| 4,723,909 | 2/1988 | Rouvet | 198/774.4 X |
| 4,781,285 | 11/1988 | Schlatter et al. | 198/774.1 |
| 5,275,064 | 1/1994 | Hobbs | 414/749 X |
| 5,291,986 | 3/1994 | Wheaton | 198/468.6 |
| 5,368,150 | 11/1994 | Okada et al. | |

FOREIGN PATENT DOCUMENTS

| | | |
|---|---|---|
| 62-74556 | 4/1987 | Japan. |
| 62-58867 | 12/1987 | Japan. |
| 4-13252 | 2/1992 | Japan. |
| 2179016 | 2/1987 | United Kingdom. |

*Primary Examiner*—Donald W. Underwood
*Attorney, Agent, or Firm*—Oblon, Spivak, McClelland, Maier & Neustadt, P.C.

[57] ABSTRACT

An automatic transfer apparatus includes a plurality of transfer units which are disposed to face machining units aligned with spacing. Each transfer unit comprises a support base having a workpiece supporting surface and a workpiece positioning mechanism provided on the workpiece supporting surface, an elevation member supported by the support base for vertical movement, an elevating mechanism for lifting and lowering the elevation member between first and second positions, a transfer member supported on the elevation member for movement in a transfer direction and having a workpiece supporting portion, and a reciprocating mechanism for reciprocating the transfer member. The reciprocating mechanism includes a speed doubling mechanism which is composed of a stationary rack gear provided on the elevation member, a movable rack gear provided on the transfer member, a pinion gear engaged with both rack gears, and a feed mechanism for moving the pinion gear in the transfer direction by a distance roughly corresponding to half the distance between midpoints of adjacent machining units.

8 Claims, 3 Drawing Sheets

AUTOMATIC TRANSFER APPARATUS

BACKGROUND OF THE INVENTION

1. Field of the Invention

The present invention relates to an automatic transfer apparatus used in a machining system, such as a transfer unit of a transfer machine.

2. Discussion of Related Art

In transfer machines, automatic transfer apparatus of a so-called lift-and-carry type have been widely used. An example of such automatic transfer apparatus is shown in FIG. 1.

In the automatic transfer apparatus, a transfer bar 51 having positioning blocks 50 for receiving workpieces W is arranged for movement in a transfer direction and for up and down movement. One longitudinal end of the transfer bar 51 is engaged with a vertically extending guide plate 52 via a pair of guide rollers 53. Therefore, the transfer bar 51 is movable only in a vertical direction with respect to the guide plate 52. The guide plate 52 is slidably guided by a pair of guide bars 54 which are supported by a machine frame to be parallel with each other and extend in the transfer direction. Also, the guide plate 52 is engaged with a feed screw 56 which is arranged in parallel with the guide bars 54 and is driven by a servomotor 55 for transfer movement.

A transmission shaft 57 is disposed under the transfer bar 51 in parallel therewith for reciprocating movement in the transfer direction. To one end of the transmission shaft 57, a piston rod of a hydraulic cylinder 58 is connected. A suitable number of bell cranks 59 are disposed between the transfer bar 51 and the transmission shaft 57 at predetermined intervals for rotational movement. The lower ends of the bell cranks 59 are coupled with the transmission shaft 57, while support rollers 60 for supporting the transfer bar 51 are attached to the upper ends of the bell cranks 59.

In the above-described lift-and-carry type transfer apparatus, when a single machining operation at each machining unit of the transfer machine is completed, the transmission shaft 57 is moved by the hydraulic cylinder 58 to the left, as viewed in FIG. 1. Due to the movement of the transmission shaft 57, the bell cranks 59 rotate in the clockwise direction so that the transfer bar 51 is lifted by the support rollers 60, whereby workpieces W are lifted altogether. During this lift movement, the pair of guide rollers 53 move upward while rolling on the guide plate 52.

The feed screw 56 is then rotated by the servomotor 55 so that the guide plate 52 is displaced in the transfer direction by a distance corresponding to the pitch of the machining stations. This movement of the guide plate 52 is transmitted to the transfer bar 51 via the guide rollers 53 so that the transfer bar 51 is moved in the transfer direction by the distance corresponding to the distance between the midpoints of adjacent machining stations. As a result, the workpieces W are transferred to downstream machining stations. Subsequently, the transmission shaft 57 is moved by the hydraulic cylinder 58 to the right, as viewed in FIG. 1. With this operation, the bell cranks 59 are rotated in the counterclockwise direction so that the transfer bar 51 is lowered. As a result, the workpieces W are all seated on the workpiece supporting locations of the machining stations. Then, machining operations are carried out. After the transfer bar 51 is lowered to the lowest position, the feed screw 56 is reversely rotated by the servomotor 55 so that the transfer bar 51 is moved in a direction opposite to the transfer direction by the distance corresponding to the distance noted above between adjacent machining stations. As a result, the transfer bar 51 is returned to the original position.

In the above-described conventional transfer apparatus, the transfer bar 51 is designed to have a length substantially equal to the entire length of the machining line. Accordingly, the length of the transfer bar 51 must be a predetermined length corresponding to the number of machining stations.

Therefore, when the number of the machining stations in the transfer machine is changed, the transfer bar 51 of the transfer apparatus must be replaced with a different one having a different length to adapt the change in the entire length of the transfer line.

However, a considerably long time is required to replace the transfer bar 51 with a different one having a different length for changing the length of the transfer line. Accordingly, the transfer machine must be stop for a long time.

SUMMARY OF THE INVENTION

An object of the present invention is to provide an improved automatic transfer apparatus which makes it possible to easily change the length of a transfer line of a transfer machine in accordance with a change in the number of the machining stations.

Briefly, an automatic transfer apparatus according to the present invention comprises a plurality of transfer units which are disposed to face machining units aligned with spacing. Each transfer unit comprises a support base having a workpiece supporting surface and workpiece positioning means provided on the workpiece supporting surface, an elevation member supported by the support base for vertical movement, elevating means for lifting and lowering the elevation member between first and second positions, a transfer member supported on the elevation member for movement in a transfer direction and having a workpiece supporting portion, and reciprocating means for reciprocating the transfer member by a distance corresponding to a pitch of the machining units.

In the automatic transfer apparatus according to the present invention, even when the number of machining stations is changed and accordingly the length of the transfer line varies, it is not necessary to change a transfer bar with a different one having a different length. Accordingly, the length of the transfer line can be easily changed in accordance with a variation in the number of the machining units which are lined with spacing. Moreover, the work required for changing the length of the transfer line can be completed within a shorter time compared to the case in which a transfer bar is exchanged with a different one. Accordingly, it is not necessary to stop the transfer machine for a long period of time even when the number of the machining stations is changed, thereby increasing the production efficiency.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENTS

In the following embodiments, transfer units of a transfer machine will be described, with reference to the accompanying drawings, as an example of an automatic transfer apparatus for a machining apparatus according to the present invention.

In the following description, a "transfer direction" means the rightward direction in FIG. 2, while a "lateral direction" means the up-and-down direction as viewed in FIG. 2.

Figure 1:
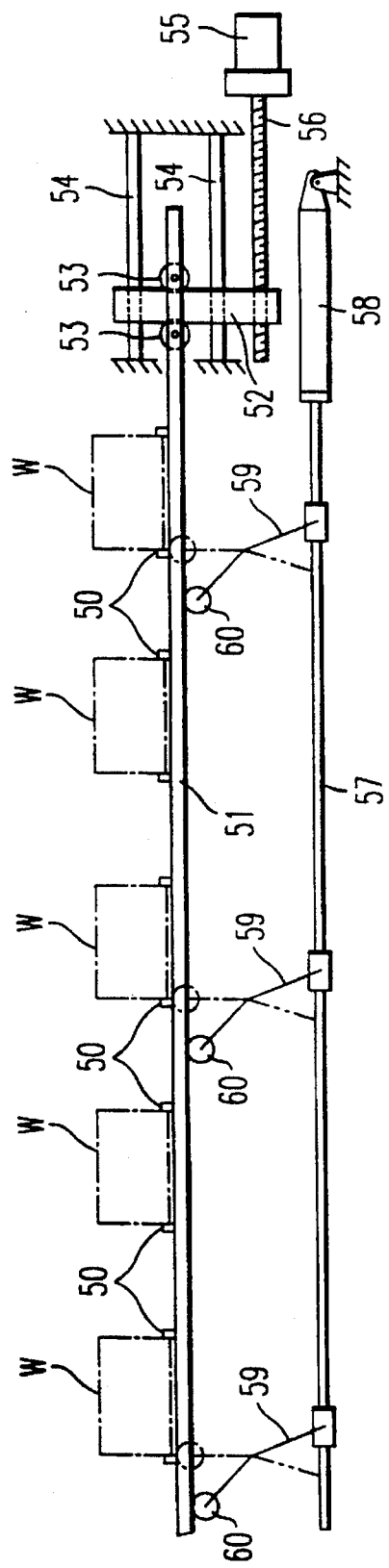
FIG. 1 is a view showing the structure of a conventional transfer apparatus of a transfer machine.
Figure 2:
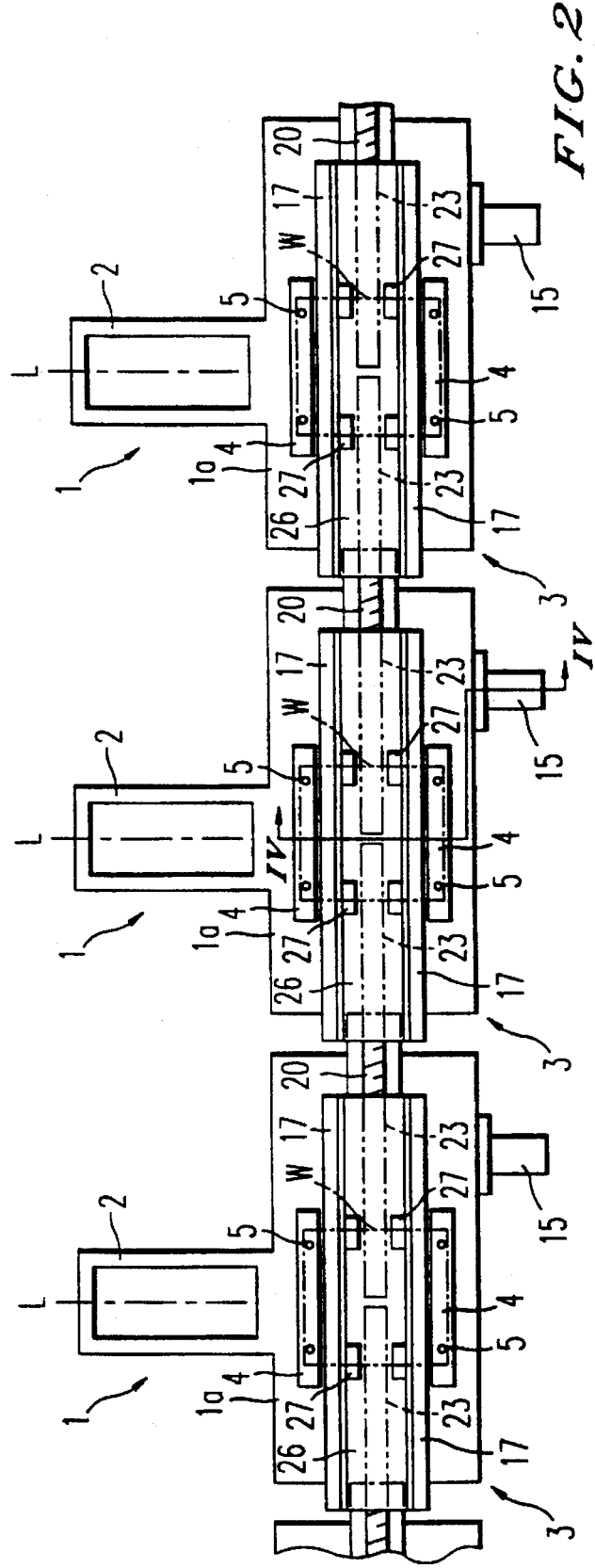
FIG. 2 is a plan view of a transfer machine according to an embodiment of the present invention.

As shown in FIG. 2, each of machining stations 1 of the transfer machine is composed of a machining unit and a transfer unit. The machining stations 1 are successively disposed in order of machining steps to constitute the transfer machine.

Figure 3:
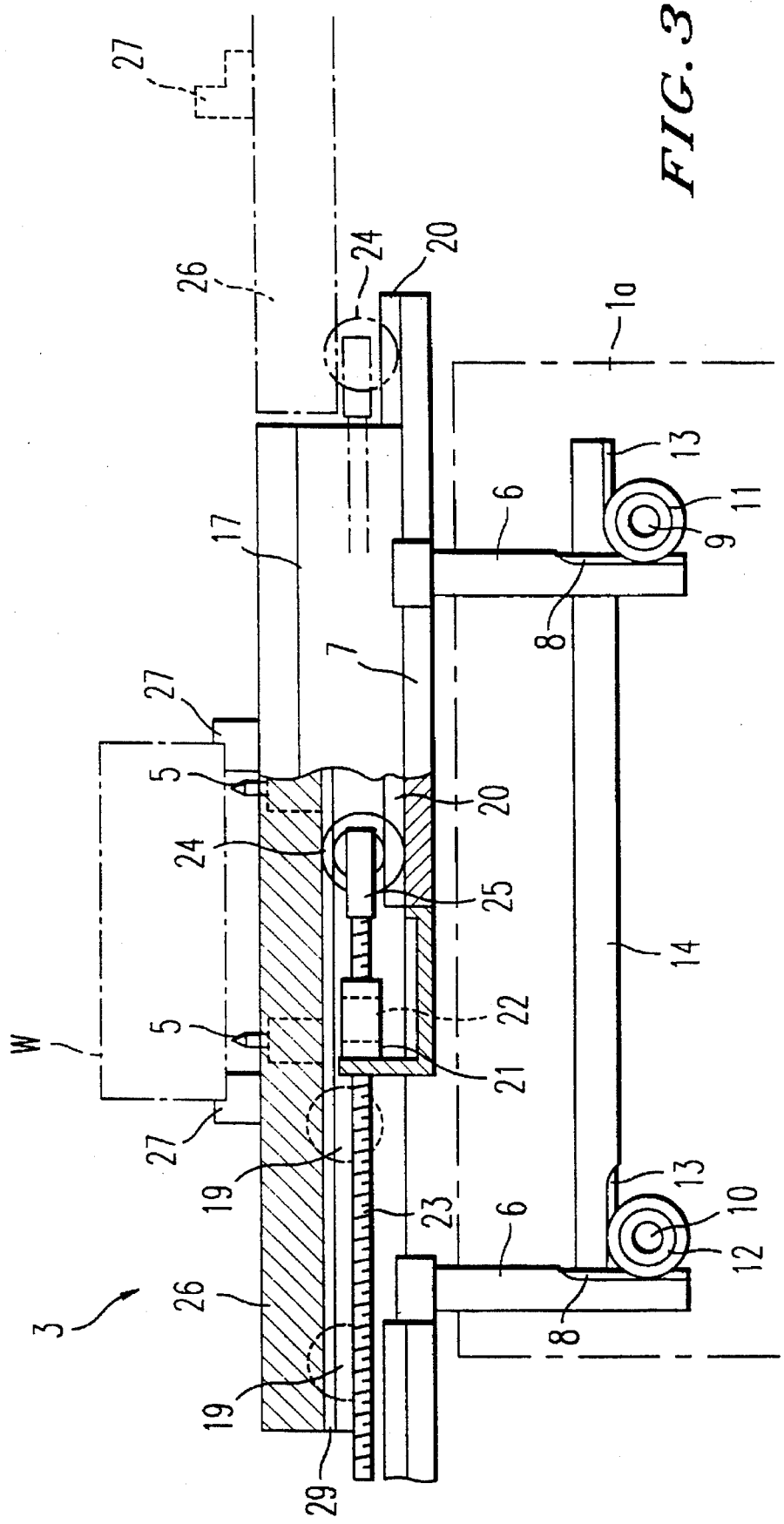
FIG. 3 is a partially sectioned front view of the transfer machine shown in FIG. 2.
Figure 4:
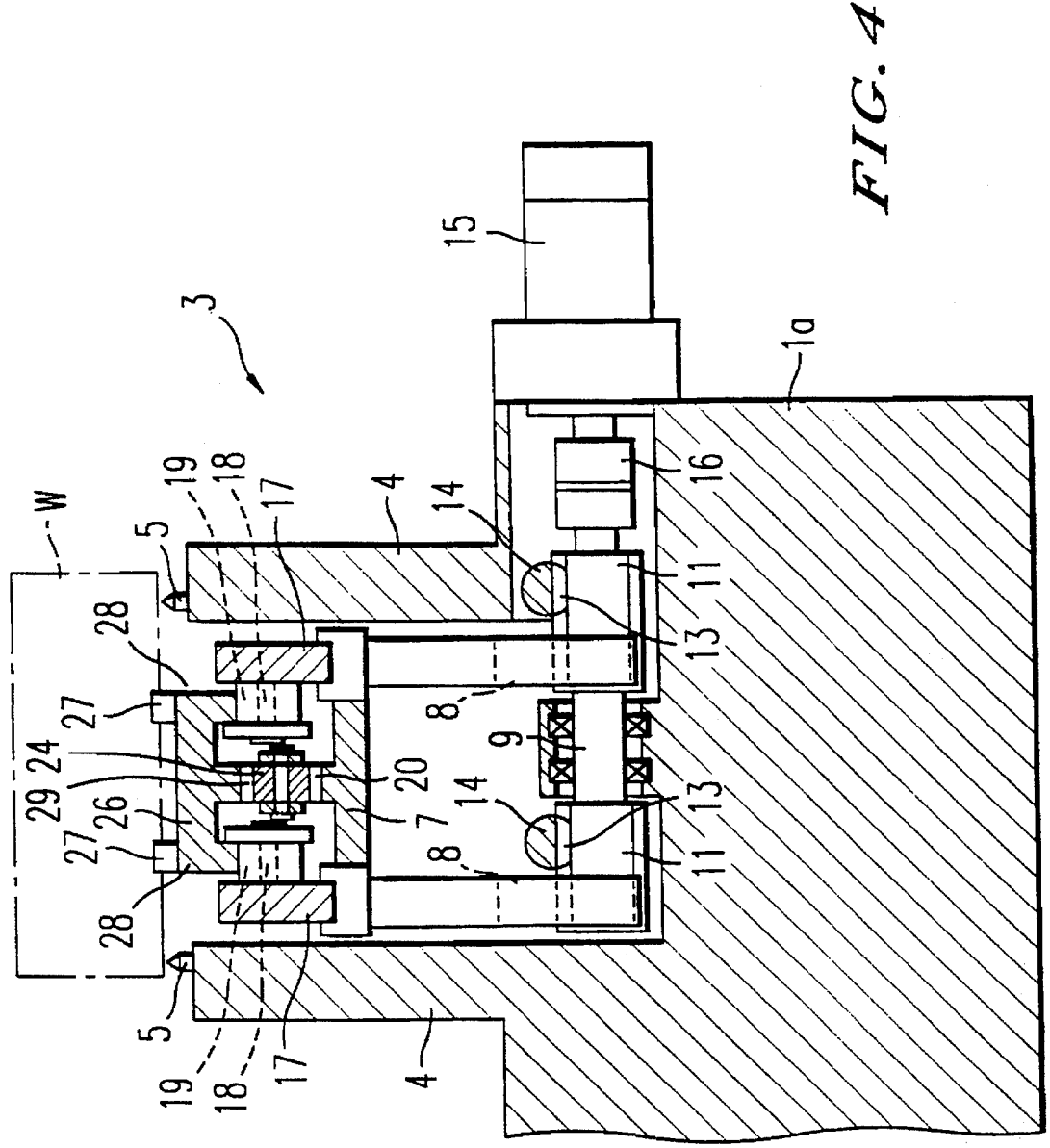
FIG. 4 is a sectional view taken along line IV—IV in FIG. 2.

First, one of the machining stations 1 will be described. As shown in FIG. 2 through FIG. 4, a machining unit 2 is disposed on a rear portion of a base 1a of a machining station 1, while a transfer unit 3 facing the machining unit 2 is disposed on a front portion of the base 1a of the machining station 1.

The length of the transfer unit 3 in the transfer direction is roughly equal to the pitch of the machining units 2 of the transfer machine. Each machining unit 2 faces the central portion of the corresponding transfer unit 3 in the transfer direction.

In the transfer unit 3, a pair of parallel walls perpendicular to an axis L of a main spindle of the machining unit 2 are formed on the base 1a with a space in the lateral direction. The walls extend in the transfer direction to form a support base 4.

On the top surface of each wall of the support base 4, i.e., on the workpiece supporting surface, positioning pins 5 are embedded at locations in front of the machining unit 2 with space therebetween in the transfer direction. Between the walls, i.e., in the central space section of the support base 4, there is disposed an elevation member 7 which has a length in the traverse direction which is roughly equal to the length of the support base 4 in the traverse direction. The elevation member 7 is provided with four leg members 6 which are arranged with spacing in the transfer and lateral directions. A rack gear 8 is formed on the lower end portion of each leg member 6 at the front (or back) side thereof as viewed in the transfer direction.

Under the support base 4, a pair of rotary shafts 9 and 10 are disposed with a space in the transfer direction, as shown in FIG. 3, and are supported by bearings. Two pinion gears 11 are formed on the rotary shaft 9, and two pinion gears 12 are formed on the rotary shaft 10. These pinion gears 11 and 12 are meshed with the pinion gears 8 of the leg members 6. A pair of parallel interlocking shafts 14 are provided in the space section of the support base 4 and allowed to move in the transfer direction. Each interlocking shaft 14 is provided at its both ends with rack gears 13 which are engaged with one of the pinion gears 11 and one of the pinion gears 12 which form a pair in the transfer direction.

One of the rotary shafts 9 and 10 are connected to a servomotor 15 for elevation movement via a coupling 16.

A pair of side walls 17 extending in the transfer direction are provided at both lateral edges of the upper surface of the elevation member 7 which top surface is lower than the workpiece supporting surface of the support base 4. Support shafts 18 are embedded into the inside surfaces of the side walls 17 such that each support shaft 18 embedded into one of the side walls 17 faces a corresponding support shaft 18 on the other wall 17 to form a pair, and a plurality of such pairs are arranged in the transfer direction at a predetermined pitch. Support rollers 19 are rotatably supported by the support shafts 18.

A stationary rack gear 20 is formed on the upper surface of the elevation member 7 at a laterally central position between the side walls 17. The stationary rack gear 20 has a length which is roughly equal to half the length of the elevation member 7 and is located at the downstream side in the transfer direction.

As shown in FIG. 3, a servomotor 21 for transfer movement is attached to the elevation member 7 at a location near the rear end of the stationary rack gear 20. The rotor of the servomotor 21 has a through hole, and a nut 22 is fitted into the through hole. A feed screw 23 penetrating the through hole of the rotor is engaged with the nut 22. The forward end of the feed screw 23 extends to a position above the rear end of the stationary rack gear 20. A support bracket 25 is attached to the forward end of the feed screw 23, and a pinion gear 24 is supported by the support bracket 25 for rotation about an axis perpendicular to the axis of the feed screw 23.

A transfer member 26 having the roughly same length as the side walls 17 is supported on the elevation member 7 via the support rollers 19. Positioning blocks 27 for positioning and supporting a workpiece W are arranged in a central region of the upper surface of the transfer member 26 as viewed in the transfer direction. On the lower surface of the transfer member 26, there are formed a pair of rails 28 which extend in the transfer direction and are supported by the two lines of the support rollers 19, as shown in FIG. 4. Moreover, a movable rack gear 29 extending in the transfer direction is formed on the lower surface of the transfer member 26 to be located between the rails 28 and face the stationary rack gear 20.

The pinion gear 24 is sandwiched between the stationary rack gear 20 and the movable rack gear 29, and is engaged with both rack gears at the same time. Further, the rails 28 are engaged with the support rollers 19. Therefore, when the pinion gear 24 is advanced in the transfer direction, the transfer member 26 is advanced by a distance double the distance by which the pinion gear 24 is advanced. Moreover, the forward end of the stationary rack gear 20 is overlapped with an adjacent transfer unit. With this structure, a sufficient transfer stroke can be obtained.

The positioning blocks 27 are located above the positioning pins 5 of the support base 4 when the elevation member 7 is located at its lifted position, and are located below the positioning pins 5 of the support base 4 when the elevation member 7 is located at its lowered position.

As described above, a plurality of machining stations 1 having the above-described structure are disposed in order of machining steps to constitute a transfer machine. Therefore, the support rollers 19 of the elevation members 7 of the machining stations 1 form two straight continuous lines of support rollers.

In each machining station, the workpiece W is supported by the workpiece supporting surface of the supporting base 4, while positioning holes formed in the workpiece W are engaged with the positioning pins 5. In this state, the machining unit 2 is advanced to machine the workpiece W. At this time, the elevation member 7 is located at the lowered position, and the transfer member 26 is located at the original or retracted position, i.e., at the center of the transfer unit 3. Therefore, the positioning blocks 27 are located below the workpiece W and are separated therefrom.

After the completion of machining, the machining unit 2 is retracted, and a transfer operation is started.

First, the servomotor 15 for elevation movement is driven to rotate the rotary shaft 9, i.e., the pinion gears 11 in the clockwise direction, as viewed in FIG. 3, via the coupling 16. As a result, the rack gears 8 are synchronously elevated directly or via the rack gears 13, the interlocking shafts 14, the pinion gears 12, and the rotary shaft 10. Since the four leg shafts 6 are synchronously elevated, the elevation member 7 is also elevated while maintaining its horizontal posture. With this operation, the transfer member 26 is lifted via the support rollers 19 so that the workpiece W is lifted via the positioning blocks 27 and is separated from the positioning pins 5 of the support base 4.

The above-described operation is also carried out in the transfer unit 3 of an adjacent machining station 1 on the downstream side. Even in the case where no workpiece W exists in the adjacent machining station 1, the elevation member 7 in the adjacent machining station 1 is also raised to its lifted position.

Subsequently, the servomotor 21 for transfer movement is driven to rotate the nut 22, whereby the feed screw 23 is moved in the transfer direction (to the right in FIG. 3). Accordingly, the pinion gear 24 engaged with the stationary and movable rack gears 20 and 29 moves in the transfer direction while rotating in the clockwise direction. As a result, the transfer member 26 supporting the workpiece W is moved in the transfer direction at a speed double the moving speed of the pinion gear 24. When the pinion gear 24, which was initially located at the rear end of the stationary rack gear 20, reaches the forward end of the stationary rack 20, the servomotor 21 for transfer movement is stopped. With this movement, the pinion gear 24 is moved in the transfer direction by a distance which is roughly equal to half the distance between the midpoints of adjacent machining units 2 of the transfer machine.

As a result, the transfer member 26 is displaced in the transfer direction by a distance roughly corresponding to the overall length of the transfer unit 3, i.e., the distance between midpoints of the adjacent machining units 2, while being supported by the support rollers 19. With this operation, the transfer member 26 is transferred to the transfer unit 3 of the next machining station 1 and is supported by the support rollers 19 of the elevation member 7 in the adjacent transfer unit 3, which has already been raised to the lifted position. With this operation, the workpiece W supported by the positioning blocks 27 of the transfer member 26 is transferred to a predetermined position over the positioning pins 5 of the support base 4 in the next machining station 1.

Subsequently, the servomotor 15 for elevation movement is driven in the reverse direction. The rotational shaft 9 and the pinion gears 11 are rotated in the counterclockwise direction, as viewed in FIG. 3. As a result, the rack gears 8 are synchronously lowered directly or via the rack gears 13, the interlocking shafts 14, the pinion gears 12, and the rotary shaft 10. Since the four leg shafts 6 are synchronously moved downward, the elevation member 7 is lowered while maintaining its horizontal posture. With this operation, the transfer member 26 is lowered via the support rollers 19 so that the workpiece W is lowered via the positioning blocks 27 and is engaged with the positioning pins 5 of the support base 4 via the positioning holes formed in the workpiece W. In this way, the workpiece W is positioned at a predetermined location on the support base 4 facing the machining unit 2 and is fixed to the support base 4. Since the positioning blocks 27 of the transfer member 26 are further lowered, they are separated from the workpiece W. After the completion of such transfer operation, the machining unit 2 is retracted, and the next machining operation is carried out.

Moreover, the transfer member 26 which has been lowered to the lowermost position is returned to its original position by the similar movements of the various parts of the transfer unit 3 in opposite directions. In detail, the servomotor 21 for transfer movement is driven in the reverse direction to rotate the nut 22 in the reverse direction, whereby the feed screw 23 is moved in the direction opposite to the transfer direction (to the left in FIG. 3). Accordingly, the pinion gear 24 engaged with the stationary and movable rack gears 20 and 29 moves in the direction opposite to the transfer direction while rotating in the counterclockwise direction, as viewed in FIG. 3. As a result, the transfer member 26 is moved in the direction opposite to the transfer direction at a speed double the moving speed of the pinion gear 24. When the pinion gear 24, which was located at the forward end of the stationary rack gear 20, reaches the rear end of the stationary rack 20, the servomotor 21 for transfer movement is stopped.

As a result, the transfer member 26 is displaced in the direction opposite to the transfer direction by a distance roughly corresponding to the overall length of the transfer unit 3, i.e., the pitch of the machining units 2, while being supported by the support rollers 19. With this operation, the transfer member 26 is moved back to the transfer unit 3 of the adjacent original machining station 1 and is supported by the support rollers 19 of the elevation member 7 of the original transfer unit 3, which has already been lowered to the lowermost position. The transfer member 26 is thus returned to the original position.

In the above-described embodiment, a speed doubling mechanism (a pinion-and-rack mechanism in the embodiment) is employed to make the transfer unit 3 of each machining station 1 which are same in terms of their structure. However, the speed doubling mechanism may be omitted.

In such a case, a feed screw 23 having a length roughly corresponding to the distance between midpoints of the adjacent machining units 2 is disposed on the elevation member 7 such that the feed screw 23 projects from the transfer unit 3 in the transfer direction or the direction opposite thereto. The feed screw 23 is engaged with the nut 22 which is driven by the servomotor 21 for transfer movement, and the forward end of the feed screw 23 is engaged with the transfer member 26 to transfer movement of the feed screw to the transfer member 26.

In this case, since the feed screw 23 projects from the transfer unit 3, the feed screws 23 of two adjacent transfer units 3 must be disposed such that the positions of the feed screws 23 in the direction perpendicular to the transfer direction differ from each other to prevent interference therebetween. Accordingly, two different kinds of transfer units 3 which differ from each other in the arrangement of the feed screws 23 are prepared, and these transfer units 3 are alternately disposed.

Moreover, although the machining unit 2 and the transfer unit 3 are mounted on the common base 1a of the machining station 1, in the above-described embodiment, the transfer unit 3 may be mounted on a separate base to make the transfer unit 3 independent of the machining unit 2.

Obviously, numerous modifications and variations of the present invention are possible in light of the above teachings. It is therefore to be understood that within the scope of the appended claims, the present invention may be practiced otherwise than as specifically described herein.

What is claimed is:

1. The combination of machining units arranged in a line with spacing and an automatic transfer apparatus, which comprises:

a plurality of transfer units each of which is disposed adjacent to one of the machining units arranged in said line with spacing, wherein each of said transfer units comprises:

a support base which comprises a base of each said transfer unit;

an elevation member supported on said support base and being vertically movable;

an elevating mechanism lifting and lowering said elevation member between first and second positions;

a transfer member supported on said elevation member, said transfer member being movable in a transfer direction and carrying the workpiece; and a reciprocating mechanism reciprocating said transfer member by a distance corresponding to a distance between midpoints of said adjacent machining units, said reciprocating mechanism comprising a feed mechanism moving said transfer member in the transfer direction and a motion hastening mechanism hastening motion of said transfer member.

2. An automatic transfer apparatus according to claim 1, wherein said motion hastening mechanism comprises:

a stationary rack gear provided on said elevation member;

a movable rack gear provided on said member; and a pinion gear engaged with both of said stationary and movable rack gears.

3. An automatic transfer apparatus according to claim 2, wherein said feed mechanism comprises:

a feed screw extending in the transfer direction and carrying said pinion gear at its end;

a nut engaged with said feed screw; and a servomotor disposed on said elevation member and rotating said nut.

4. An automatic transfer apparatus according to claim 3, wherein said servomotor comprises a rotor having a through hole through which said feed screw penetrates, and into which said nut is fitted.

5. An automatic transfer apparatus according to claim 1, wherein said elevating mechanism comprises:

a plurality of struts supporting said elevation member and being vertically movable; and a mechanism synchronizing said plurality of struts to lift and lower said elevation member.

6. An automatic transfer apparatus according to claim 1, wherein said workpiece is positioned on said transfer member when said elevation member is located at the first position, and is positioned on said support base when said elevation member is located at the second position.

7. An automatic transfer apparatus according to claim 1, wherein said motion hastening mechanism includes a combination of two or more gears.

8. The combination of machining units arranged in a line with spacing and an automatic transfer apparatus comprising a plurality of transfer units, wherein each of said transfer units comprises:

a support base which comprises a base of each said transfer unit;

an elevation member supported on said support base and being vertically movable;

an elevating mechanism lifting and lowering said elevation member between first and second positions;

a transfer member supported on said elevation member, said transfer member being movable in a transfer direction and carrying the workpiece; and a reciprocating mechanism reciprocating said transfer member by a distance corresponding to a distance between midpoints of said adjacent machining units, said reciprocating mechanism comprising a feed mechanism moving said transfer member in the transfer direction and a motion hastening mechanism hastening motioning of said transfer member, wherein said reciprocating mechanism comprises;

a feed screw extending in the transfer direction and having a length corresponding to the distance between the midpoints of said adjacent machining units, one end of the feed screw being engaged with said transfer member and transmitting movement of the feed screw in the transfer direction to said transfer member;

a nut engaged with said feed screw; and a servomotor disposed on said elevation member and rotating said nut.

* * * * *